United States Patent
Frye et al.

(10) Patent No.: US 8,562,835 B2
(45) Date of Patent: Oct. 22, 2013

(54) FLUID FILTER

(75) Inventors: Michael John Ernest Frye, London (GB); Søren Ingemann Jensen, London (GB); Philip McIntyre, Preston (GB)

(73) Assignee: Water Maiden Limited (GB)

( * ) Notice: Subject to any disclaimer, the term of this patent is extended or adjusted under 35 U.S.C. 154(b) by 1057 days.

(21) Appl. No.: 11/569,302

(22) PCT Filed: May 20, 2005

(86) PCT No.: PCT/GB2005/002013
§ 371 (c)(1),
(2), (4) Date: Dec. 11, 2007

(87) PCT Pub. No.: WO2005/113111
PCT Pub. Date: Dec. 1, 2005

(65) Prior Publication Data
US 2008/0121587 A1     May 29, 2008

(30) Foreign Application Priority Data
May 20, 2004 (GB) .................................. 0411290.0

(51) Int. Cl.
*B01D 65/02* (2006.01)
*B01D 61/00* (2006.01)
*B01D 63/00* (2006.01)
*B01D 24/00* (2006.01)
*C02F 1/24* (2006.01)

(52) U.S. Cl.
USPC ... 210/636; 210/650; 210/321.8; 210/321.69; 210/350; 210/90; 210/505; 210/768

(58) Field of Classification Search
USPC .................. 210/636, 650, 798, 50–509, 768; 261/94
See application file for complete search history.

(56) References Cited

U.S. PATENT DOCUMENTS

| | | | | |
|---|---|---|---|---|
| 4,219,420 A | * | 8/1980 | Muller | 210/798 |
| 4,793,932 A | * | 12/1988 | Ford et al. | 210/636 |
| 4,851,136 A | * | 7/1989 | Fanqing et al. | 210/798 |
| 4,917,797 A | * | 4/1990 | Inacio et al. | 210/184 |
| 4,961,464 A | * | 10/1990 | Wollbeck et al. | 165/83 |
| 5,470,470 A | * | 11/1995 | Leyat | 210/350 |
| 5,690,823 A | * | 11/1997 | Reipur et al. | 210/321.8 |
| 6,090,275 A | * | 7/2000 | Cheng | 210/90 |
| 6,180,002 B1 | * | 1/2001 | Higgins | 210/185 |
| 7,104,530 B2 | * | 9/2006 | Boye | 261/94 |
| 7,303,677 B2 | * | 12/2007 | Cote et al. | 210/615 |
| 2003/0178366 A1 | | 9/2003 | Boye | |

FOREIGN PATENT DOCUMENTS

| | | |
|---|---|---|
| DE | 1959867 | 11/1969 |
| EP | 0280052 | 8/1988 |
| EP | 0344633 | 11/1988 |

* cited by examiner

*Primary Examiner* — Ana Fortuna
(74) *Attorney, Agent, or Firm* — Price Heneveld LLP

(57) ABSTRACT

A fluid filter, particularly suitable for high pressure and high volume use, comprises a cylindrical housing (201) having an attachment plate (209) at an inlet end (202) to which is attached a plurality of bundles (303) of fibers (211), with the fibers being left unsecured at their distal end adjacent an outlet (203) of the housing. Between the bundles is provided a balloon (212) which can be distended in order to crush the fibers around the periphery of the housing. In use, a fluid to be filtered is introduced into the inlet end, adjacent to where the fibers are secured. In order to flush the filter the pressure within the balloon is released, and a flushing fluid is passed through the housing in the same direction.

28 Claims, 11 Drawing Sheets

FLUID FILTER

This application is a 371 of PCT/GB05/02013 filed on May 20, 2005, which claims priority of United Kingdom Application 0411290.0 filed on May 20, 2004.

The present invention relates to a fluid filter, and particularly although not exclusively to a high pressure and through-put filter for removing solid material from a liquid such as water.

A filter which makes use of fibres to trap material entrained within the medium is disclosed in U.S. Pat. Nos. 5,470,470 and 4,617,120. A similar device is disclosed in EP-A-0280052.

The principle of operation of the device of EP-A-0280052 is shown schematically in FIGS. 1 and 1a. The filter 100 comprises a filter housing 101 with an inlet end 102 and an outlet end 103. Extending longitudinally of the housing are a plurality of parallel fibres, held in place by a support 106. Surrounding the fibres is a flexible waterproof membrane 104.

During filtration, the membrane 104 is pressurised as shown at 107 in FIG. 1a, thereby compressing the fibres towards an internal pinch point 108. The material to be filtered is forced through the filter in the direction shown by the arrow. The filter may be flushed and cleaned by releasing the pressure within the membrane and back-flushing in the opposite direction to the normal flow of filtration.

In one particular embodiment, EP-A-0280052 discloses a distensible balloon with fibres surrounding it, so that as the balloon is distended the fibres get pushed out against the internal circumference of the filter housing.

In the embodiments described, the liquid to be filtered passes up through the loosely hanging fibres against the flow of gravity. This exemplifies the conventional understanding of filters of this type, namely that regular flow between each of the individual fibres can be expected only when the liquid goes in the direction indicated since only in that way are the fibres free to move one with respect to another to equalise the amount of fluid passing along the individual passageways between the fibres. The disadvantage is that flow rates and pressures are limited since if too high a pressure is applied at the free end the fibres will start to buckle up and get entangled with each other.

The present invention arises from the unexpected realisation that this prior understanding is in fact wrong. There is no need whatsoever for the fluid to pass in the direction shown, and the applicant has realised that if the flow direction is reversed the fluid still finds its way fairly evenly along the multitude of passages between the fibres. This fact does not depend as might be expected on being very careful in the way in which the fibres are mounted at one end, nor on the provision of a large number of small individual apertures within a mounting plate to allow the fluid to enter each and every one of the passages. On the contrary, the applicant has found that the way in which the fluid is supplied to the fibres at their fixed end is not at all critical, making it possible for the first time to provide very high volume and/or pressure filters at low cost.

According to the present invention there is provided a filter comprising a filter housing having an inlet end and an outlet end, a distensible member extending longitudinally of the housing, and a plurality of fibres extending longitudinally of the housing and being secured at the inlet end, whereby when the distensible member is distended the fibres are compressed against the housing to create a graduated filter matrix between the inlet end and a pinch area between the distensible member and an inner surface of the housing. This creates a graduated or step-less filter.

According to a further aspect of the present invention there is provided a method of operating a filter having a filter housing with a first end and a second end, a distensible member extending longitudinally of the housing and being secured at the first end, comprising distending the distensible member to compress the fibres against the housing to create a graduated filter matrix between the first end and a pinch area between the distensible member and an inner surface of the housing; comprising housing a fluid to be filtered from the first end to the second end.

The invention may be carried into practice in a number of ways, and several specific embodiments will now be described by, way of example, with reference to the accompanying drawings, in which.

Figure 1:
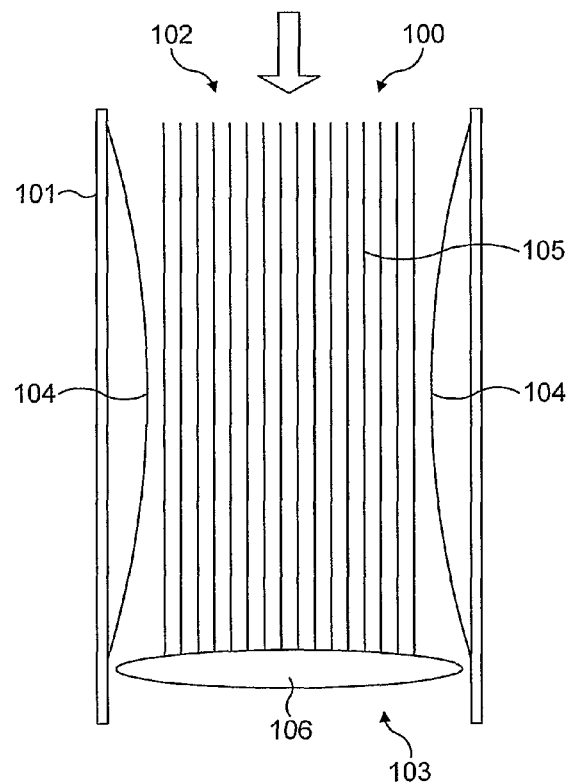
FIG. 1 is a longitudinal section through a prior art filter.
Figure 1A:
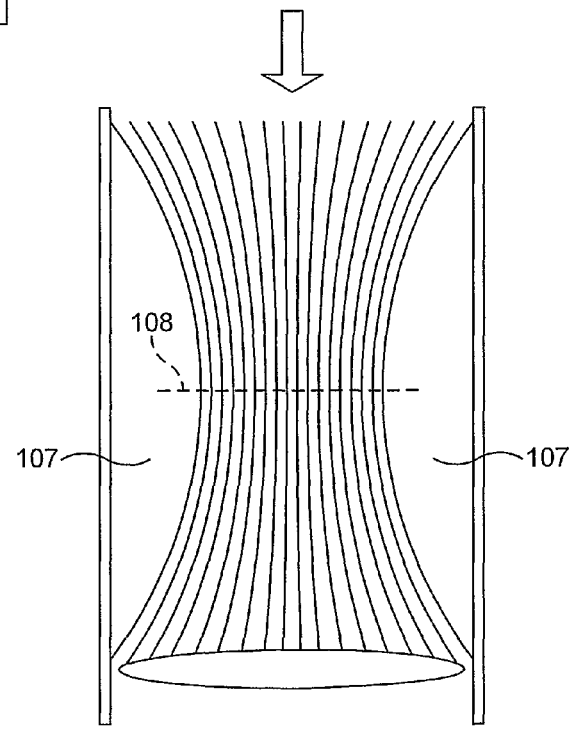
FIG. 1a is a longitudinal section through the filter of FIG. 1 in filtration mode.
Figure 2:
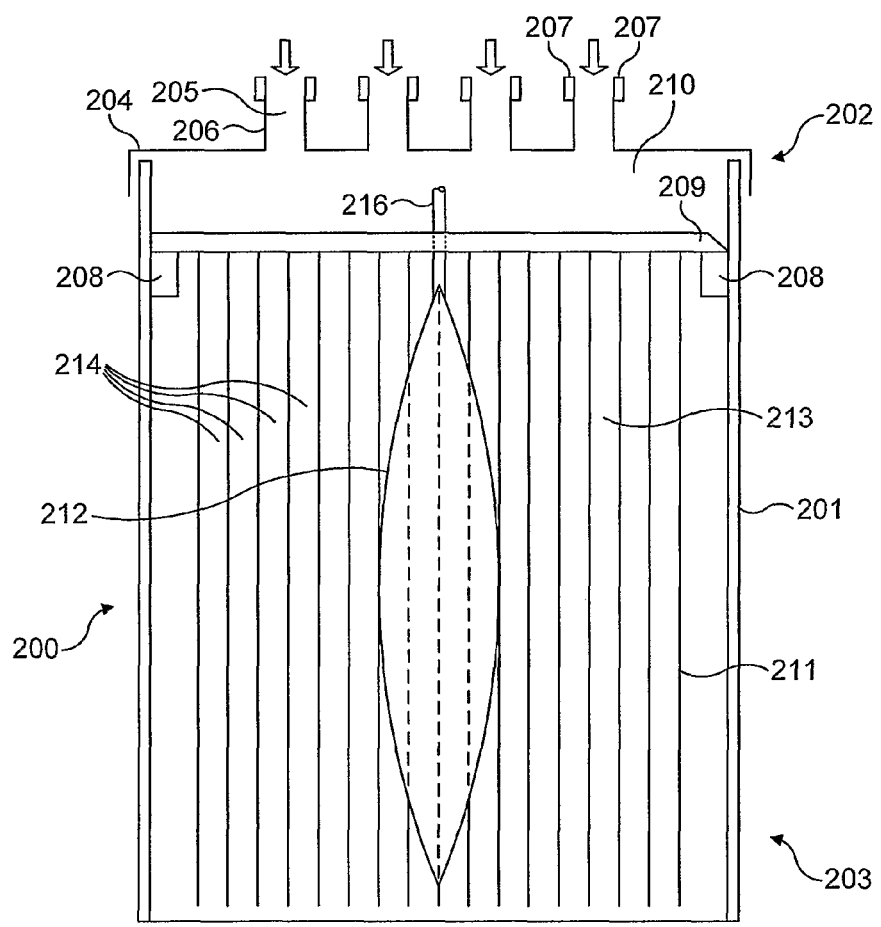
FIG. 2 is a longitudinal section through a first embodiment of the present invention.

Turning first to FIG. 2, there is shown a filter 200 of a first embodiment of the invention. The filter is contained within a cylindrical filter housing 201 the size of which may be selected according to the particular fluid pressures, flow rates or volumes required. Alternatively, the housing could be shaped so that its width tapers towards its distal ends. For example, in a specific application the housing has an external diameter of 315 mm and an internal diameter of 290 mm. The filter housing can be made of any suitable rigid material such as metal or an appropriate plastics material. The housing has an inlet end 202 and an outlet end 203, respectively allowing the filtered medium to ingress to and to egress from the filter.

The inlet end is capped by means of an inlet cap 204 having a plurality of inlet apertures 205. Each of these is supplied by an individual inlet pipe 206, thereby allowing if required for a variety of liquids and/or gases to be supplied in parallel to the filter. Suitable connecting means 207 are provided to couple the inlet pipes to further piping systems (not shown) which furnish the liquids and/or gases to the filter at the required pressure and flow rates.

Adjacent to the inlet end 202 of the housing 201 there is cast an internal securing ring 208. This ring provides a lip upon which a head matrix 209 is securely mounted. It is preferred, although not essential, that the head matrix 209 be capable of being easily removed in order to facilitate maintenance and/or replacement. The volume of the filter housing between the inlet cap 204 and the head matrix 209 defines an inlet chamber 210, within which the incoming liquids and/or gases may mix.

The outlet end 203 of the housing may be left open, as shown in FIG. 2, or alternatively an exit cap and exit pipes (not shown) may be provided to direct the outgoing fluid after it has passed through the filter.

Figure 3:
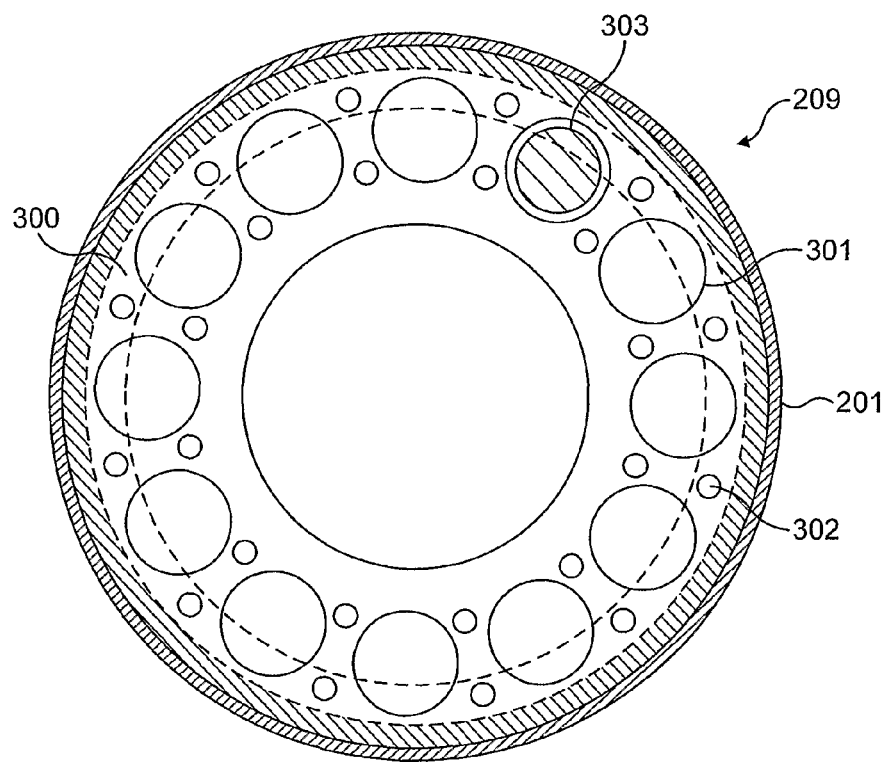
FIG. 3 is a detailed plan view of the head matrix of each of the embodiments.

Referring now to FIG. 3, the head matrix 209 consists of a removable plate 300, made from any suitable rigid materials (such as metal or a plastics material) having a plurality of apertures spaced around the circumference for the receipt of fibre bundles, one of which is shown at 303. The fibres may be secured in any convenient way within the head matrix, for example by melting together approximately 30 mm of the fibre ends to form a solid mass and then securing that mass by means of cross-struts (not shown) within the aperture 301. Between and surrounding the fibre bundle apertures 301 are a plurality of smaller apertures 302, the purpose of which is to allow for the ingress of fluid through the head matrix. Both types of aperture are preferably spaced at equidistant points around the circumference of the head matrix, so as to provide a generally uniform distribution of fibres and also a generally uniform fluid flow between and through the fibre bundles.

Turning back now to FIG. 2, it will be seen that in a filtration chamber 213 below the head matrix the individual fibres 211 of the bundles 301 spread out to form a fairly uniform fibre curtain around the periphery of the housing 201. The fibres extend substantially axially along the length of the filtration chamber 213, and are oriented substantially parallel to the direction of flow through the chamber. In this embodiment, the ends of the fibres are not secured in any way, and they simply hang loose.

The fibres 211 may be of any suitable dimension and material, depending upon application. In one example, the fibres may be of polymer or nylon, with a diameter of between 0.15 mm and 0.5 mm. The fibres may be solid or hollow, and may be of circular, rectangular or any other cross-section. For some applications, it may be advantageous for the fibres to be at least partially elastic, either along or across the fibre length. For such fibres, the desired shape-recovery characteristic may also be chosen according to the required application. The fibres may have a smooth or a rough surface and may if required be coated. Fibre coatings such as Teflon and zinc may be appropriate. They may also if desired be electrically charged. Charging the fibres will encourage ionisation, which may be important in some applications. Also it may be desired for the fluid, the fibres, areas within the housing or any combination of these to be magnetised.

Figure 2A:
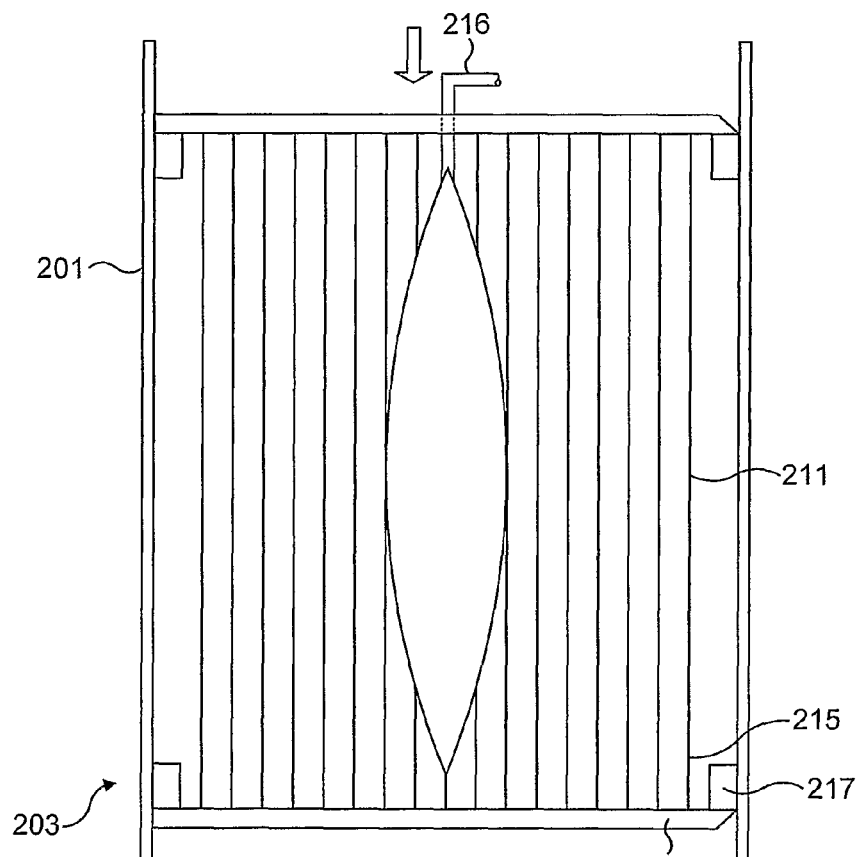
FIG. 2a is a longitudinal section through a second embodiment of the present invention.

In an alternative embodiment, shown in FIG. 2a, the fibres 211 may be secured at the outlet end 203, rather than being left loose. In this embodiment, the lower fibre ends 215 are secured an outlet matrix head 216 having apertures (not shown) for securing the fibre bundles and further apertures (also not shown) for egress of the filtrate. The outlet matrix head 216 is secured in position in some suitable way, for example by means of a further ring 217 cast on the inside of the filter housing 201. Alternatively, the outlet matrix head 216 could be left loose. In this arrangement the filter could be back flushed.

Turning back again to FIG. 2, it will be seen that secured within the centre of the filtration chamber 213 is an elongate balloon or distensible member 212. The balloon is disposed centrally within the chamber and extends substantially axially along the chamber so as to be oriented substantially parallel to the direction of flow through the filter. In a first mode, shown in FIG. 2, the balloon is relaxed and accordingly presents little or no obstruction to the free flow of fluid through the filter. Fluid entering through the apertures 302 passes substantially unobstructed between the fibre bundles and between gaps 214 between the individual fibres, before passing out of the outlet. No filtering takes place in this mode, but a van der Walls effect may develop.

When it is desired to start filtering, the balloon 212 is inflated by means of a control fluid (hydraulic or pneumatic) which is supplied along an inlet pipeline 216. Alternatively, the balloon could be filled with materials that are substantially resistive to motion (be it rapid motion or slow motion) such as a powder or particles such as sand. As is shown in the drawing, the pipeline may pass through the head matrix 209, or alternatively (not shown) the pipe may avoid the head matrix by entering from the side or from the outlet end.

Figure 4:
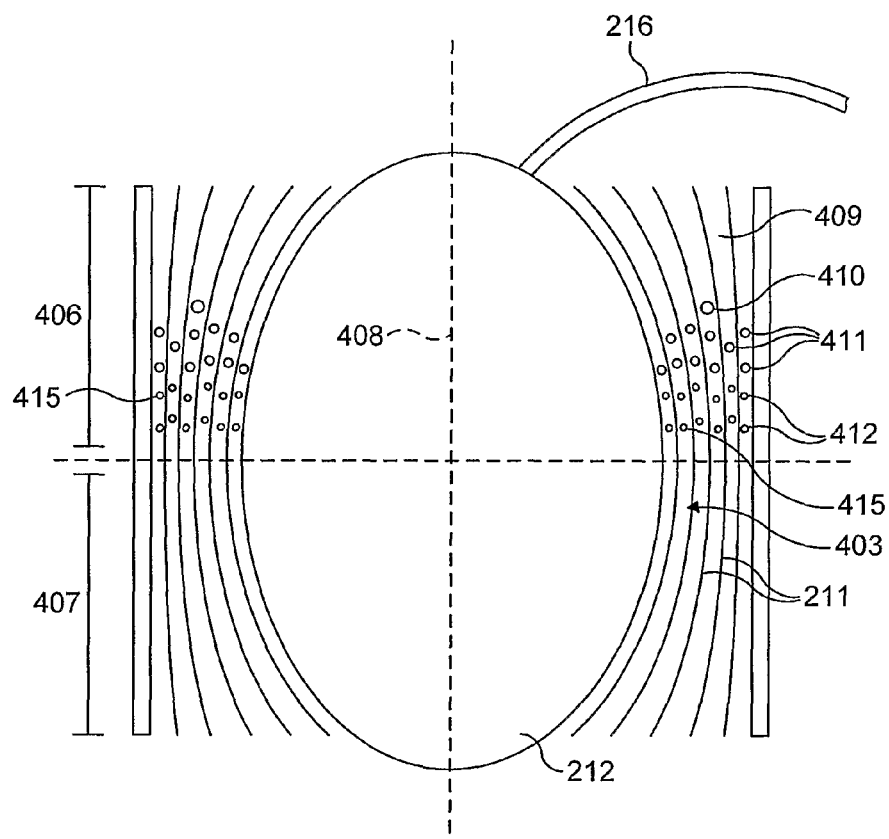
FIG. 4 is a longitudinal section showing the filter of FIG. 2 in filtration mode.

In the filtration mode of FIG. 4, the distended balloon defines a pinch point 403 consisting of a narrow annular region or area between the perimeter of the balloon and the inner circumference of the housing, where the available flow area is at a minimum. The position of the pinch point 403 defines an upstream section 406 on the inlet section of the pinch point, and a downstream section 407 on the outlet side. Preferably, the shape of the balloon is such that, in its distended state, it is substantially symmetrical about the central longitudinal axis 408 of the chamber. Depending upon the application, the upstream and downstream sections may be mirror images of each other. Alternatively (not shown) the upstream section may define a more rapidly-changing annular area, along the length of the filter, than the downstream section, or vice versa.

In any event, when the filter is in filtration mode, fluid passing through it is exposed to a gradually decreasing annular surface area up until the pinch point 403, and then is exposed to a gradually increasing annular surface area. The gradual nature of the decreasing surface area prior to the pinch point is enhanced by making the balloon 212 stiffer at its ends and softer in the middle so that, as it inflates, it forms a generally ovoid shape.

As the balloon expands, it starts to exert a radial force on the surrounding fibres, forcing the fibres to press together and to press against the rigid wall 201 of the filter housing. This of course reduces the size of the passageways 409 between the fibres.

If the fibres 211 are made of a compressible material, the fibres themselves may start to deform, thereby reducing even further the size of the passageways 409 through which the fluid can pass.

Once the balloon has been expanded to the extent required, the fluid or fluids to be filtered are passed through the filter. Typically, the fluid may comprise water or another liquid mixed with one or more solid particulates of varying sizes. As the water and the particulates pass through the upstream section, the gradually decreasing passageway size causes the particulates to be trapped between the fibres. Larger particulates 410 will be trapped relatively early, whereas finer particulates 411 will be trapped at a point closer to the pinch point 403. The very finest particles 412 will be trapped just prior to the pinch point.

The tapered and gradual increase in fibre compression within the upstream section prevents the larger particles 410 which are caught in the coarser filter matrix, defined by the upper port of the upstream section, from slipping down. This would of course be undesirable since larger particles which were to move downwards towards the pinch point would tend to reduce the gradual nature of the taper and hence the ability of the filter systematically to separate out particles of differing sizes. In the embodiments of the present invention, the gradual nature of the taper (combined in some embodiments with the natural elasticity of the fibres) ensures that each fibre is securely held by the fibres which surround it. The fibres in the upstream section cannot "flap around" or move, with the consequence that the trapped particles cannot move either.

Typically, the balloon will be distended by an appropriate amount such that only fluid can pass the pinch point. Of course, however, it will be understood that in some applications it may be perfectly acceptable for very fine particulates to pass the filter, in which case the balloon need not be distended to the same extent. By varying the hydraulic or pneumatic pressure on the line 216, the filter may be adjusted to allow through only particles which are smaller than a desired size.

Where the fluids to be filtered include both a liquid and a gas, a bubble generator (not shown) within the inlet chamber 210 may be used to ensure that the fluid to be filtered is an intimate mixture of liquid and gaseous bubbles, along with the particulates to be separated out. In some applications it may be convenient to introduce gaseous ozone to provide sterilisation during the filtration process. Where a gas is introduced into the filter, bubbles of the gas may be cut to microbubbles (that is to say bubbles of particularly small size, down to the smallest possible bubble size). This provides a substantially increased surface area of contact between the gas and the fluid to be filtered, greatly improving the aeration process. The entire unit may be turned to facilitate the aeration process.

Figure 2B:
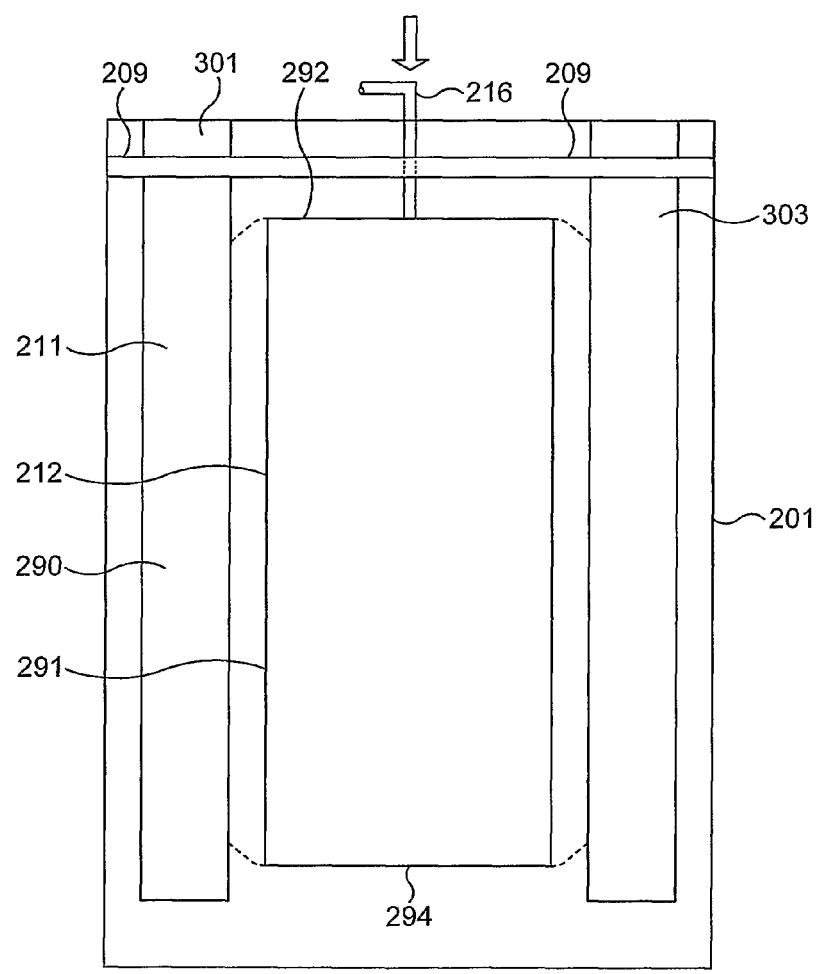
FIG. 2b is a longitudinal section through a third embodiment of the invention.

FIG. 2b shows a slightly different embodiment in which the balloon 212 is of a shape having flat upper 292 and lower 294 ends. The surface of the balloon in the distended position is shown at 291, with the dotted line 290 representing the surface of the balloon in the filtration mode. This figure also shows the way in which the fibre bundles extend through the apertures 301 of the head matrix 209. As the balloon expands and presses against these bundles, the fibres start to spread out fill the gaps between them, ultimately forming a uniform filtration matrix within the annular space between the housing and the periphery of the balloon.

Figure 2C:
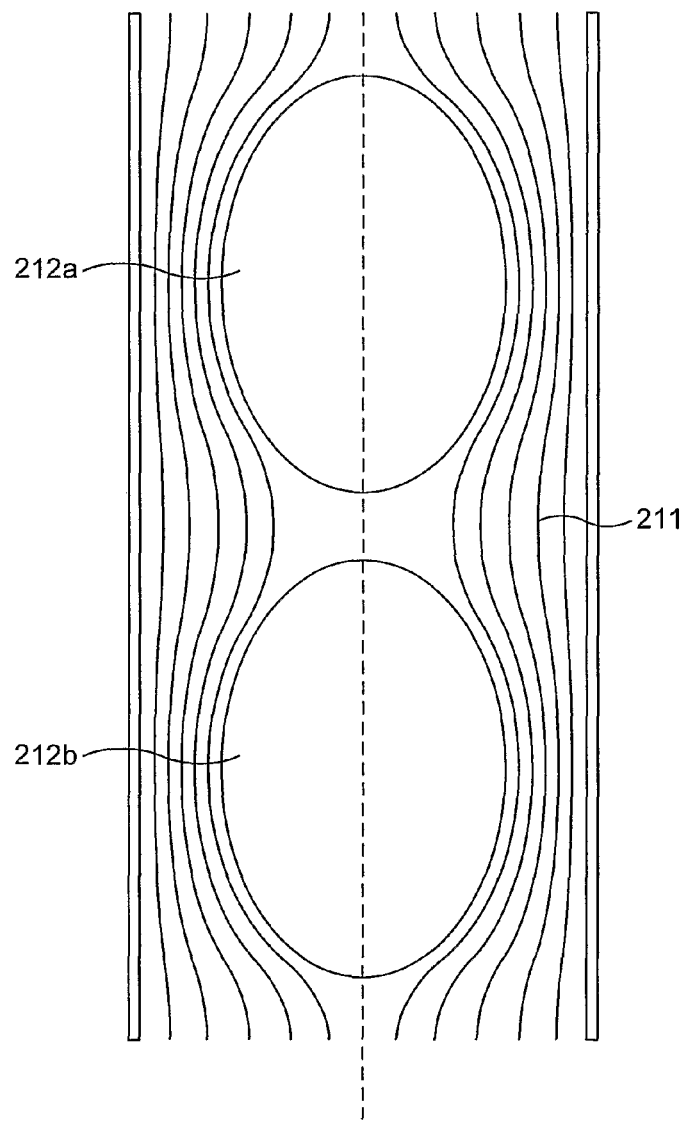
FIG. 2c is a longitudinal section through a fourth embodiment of the invention.

In a further embodiment shown in FIG. 2c, the filter includes two balloons 212a and 212b arranged in series along a central axis of the filter. The fibres 211 surround the balloons such that when the balloons are inflated as shown in FIG. 2c, they compress the fibres together against the inner wall of the housing. In this manner, more than one filter stage is provided, and the two balloons 212a and 212b can be used to filter out two different types of particles based on particle size or on another characteristic.

As filtration continues, particles of varying sizes become trapped within the upstream section 406, forming so-called "filter cake".

In the downstream area 407 beyond the pinch point 403, the fibres then naturally spread out again. The gradual enlargement of the available annular area for the filtrate, along with the presence of the fibres, encourages smooth and linear flow. The gradual enlargement of the area helps to create a Ventura effect, which further helps the flow.

In some specific applications, the required filtration characteristics may be achieved by providing ridges and/or recesses (not shown) on the surface of the balloon and/or on the inner surface of the cylindrical wall 201.

Figure 5:
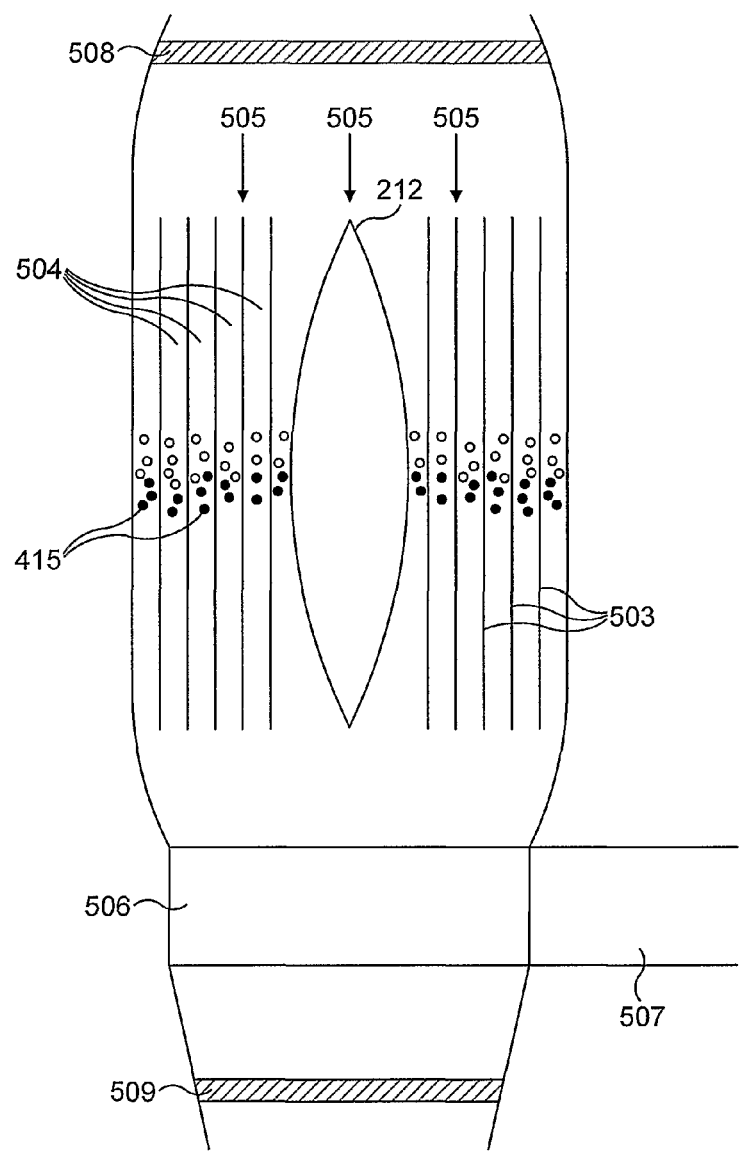
FIG. 5 is a longitudinal section of the filter of FIG. 2 in flushing mode.
Figure 6:
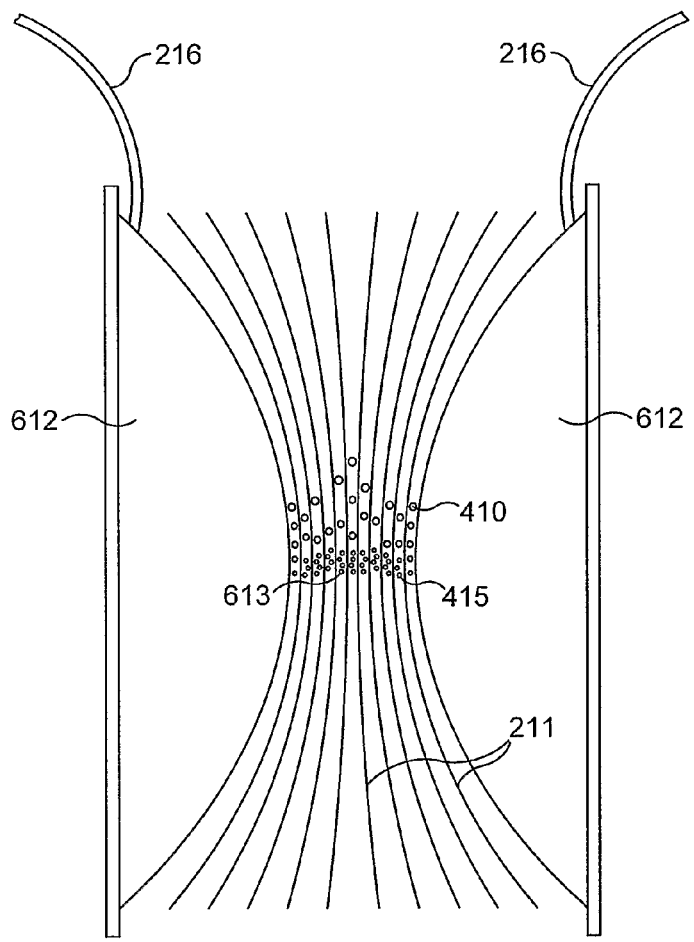
Figure 7:
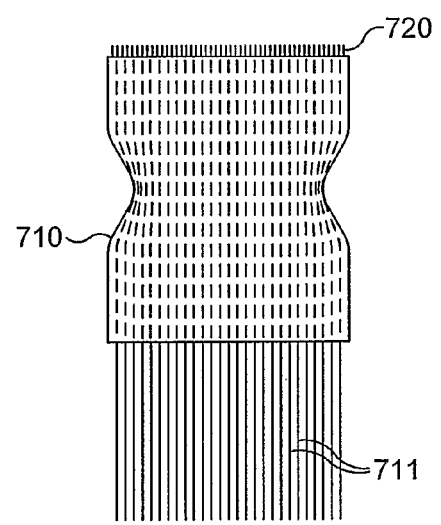
Figure 8:
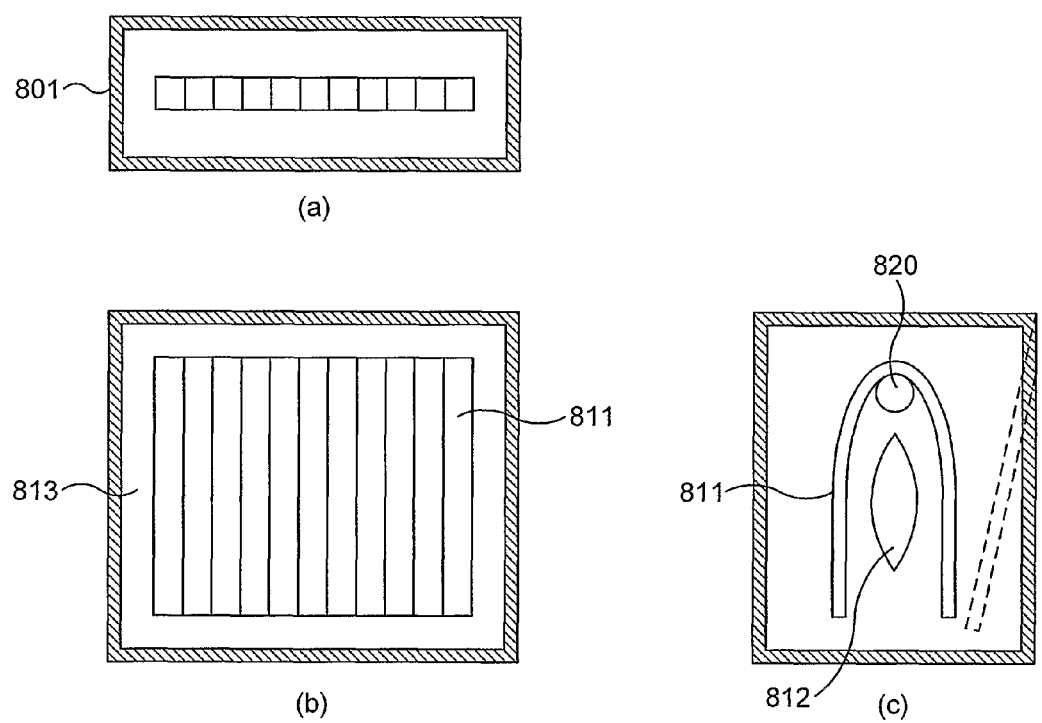
Figure 9:
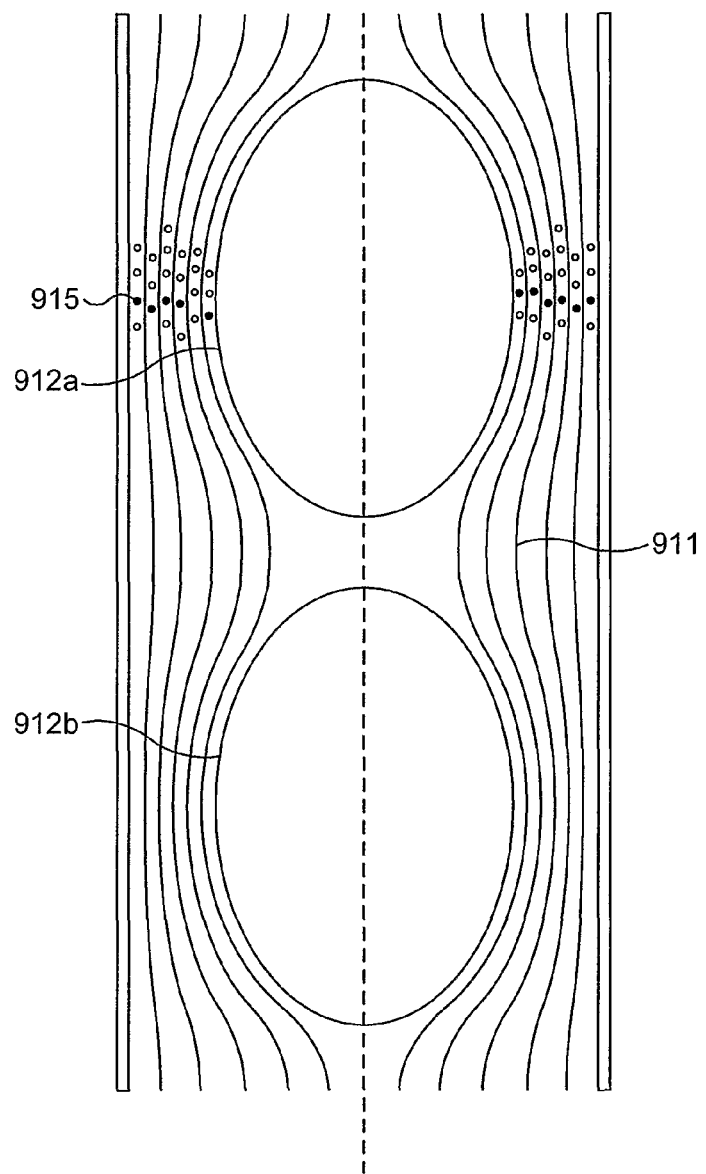

FIG. 5 schematically shows the flushing process. When the filter has been in operation for some time, a quantity of filter cake will build up. This may be removed by flushing.

In order to flush the filter, the pressure within the balloon 212 is released, thereby removing the compressive force from the fibres and allowing them to return to their uncompacted and loose state as shown at 503. As the passages 504 increase in size, the fibres reduce their grip on the filter cake, allowing the cake to be washed through by means of a rinsing medium 505. This could be any suitable cleaning liquid or gas, for example water, steam, or even the medium to be filtered (with included particulates). The rinsing medium 505 is passed through the filter in the same direction that the medium to be filtered was passed through in the filtration mode: that is, the filter is forward-flushed.

Appropriate valves 506 and piping 507 may be employed so that the washing medium and the filter cake do not contaminate the filtrate. Upstream and/or downstream pressure sensors 508, 509 may be used to determine when the filter is overly clogged with filter cake, and when it is necessary to carry out the flushing process. The process may be carried out entirely automatically, thereby maximising the time that the filter spends in the filtration mode, so increasing throughput.

As part of the flushing process, ultrasound may be applied to the filter or to the fibres to help the cake shake loose. Also, it may be desired to dry the filter cake before release by means such as generating a vacuum within the filter or passing hot air through it.

It will of course be understood that although the flushing process described above with reference to FIG. 5 will always be carried out in the forward direction, in the alternative embodiment of FIG. 2a (in which the fibres are anchored at both ends) a backward flush could be used instead or in addition, in each case either with or without releasing the balloon pressure.

The filter of the present invention may be scaled in size as desired according to the volumes to be filtered and/or the application in hand. In one preferred arrangement the filter may be manufactured as a plug-in module, in a variety of different sizes.

Although the filter is shown with its longitudinal axis vertical in the drawings, it will be understood that in some applications the axis may be horizontal. The fluid passing through the filter may be pumped, at high or low pressure, or alternatively may be allowed to pass through the filter entirely by the influence of gravity.

It will be understood that the skilled man will be able to adjust a variety of different parameters, as required according to the particular application in hand. Such adjustable parameters include pressure; temperature; fibre size; fibre length; fibre coating; charge on fibre; magnetic field strength of areas within the housing, fibres or fluid; the manner in which the fibres are anchored; flow volume; filter housing material; type of feed; method of inflating the balloon; balloon taper; flushing materials volumes and pressures; and the addition of gases to the mix.

There are a large number of specific applications which may benefit from the use of a filter according to the present invention. Typical applications might include:
1. Filtration for reverse osmosis.
2. The removal of cement, grit and so on following an industrial process such as precast concrete.
3. Separation of coagulated products.
4. Separation of biological tissue.
5. Separation of coagulated blood and the like.
6. Separation of vegetable matter, for example the waste water from olive oil production.
7. Reducing the turbidity of water generally, where required for technical or for legal reasons.
8. The removal of silt from a liquid/water.
9. Ballast water.

The invention claimed is:
1. A filter comprising a filter housing having an inlet end and an outlet end, a distensible member extending longitudinally of the housing, and a plurality of fibers extending longitudinally of the housing and being secured at the inlet end, whereby when the distensible member is distended the fibers are compressed against the housing to create a graduated filter matrix between the inlet end and a pinch area between the distensible member and an inner surface of the housing, and in which recesses or ridges are provided on the surface of the distensible member.

2. A filter as claimed in claim 1 in which the distensible member extends along a central axis of the filter housing, with the fibers surrounding the distensible member.

3. A filter as claimed in claim 1 in which the filter housing width tapers towards the distal ends of the housing.

4. A filter as claimed in claim 1 in which the fibers are secured by means of a head matrix at the inlet end.

5. A filter as claimed in claim 4 in which the head matrix comprises a plate having apertures for the ingress of fluid to be filtered.

6. A filter as claimed in claim 4 in which the head matrix comprises a plate having apertures therein within which are fixed the fibers.

7. A filter as claimed in claim 6 in which a separate bundle of fibers is fixed with each aperture.

8. A filter as claimed in claim 1 in which the fibers are secured in bundles.

9. A filter as claimed in claim 1 including flushing means for flushing the filter in a direction from the inlet end to the outlet end.

10. A filter as claimed in claim 9 including valve for separating flushing fluid from filtrate.

11. A filter as claimed in claim 1 including sensor means for determining when flushing is required.

12. A filter as claimed in claim 1 in which the fibers are elastic.

13. A filter as claimed in claim 1 in which the fibers are compressible in a direction perpendicular to their length.

14. A filter as claimed in claim 1 in which the fibers are coated.

15. A filter as claimed in claim 1 including input means at the inlet end for supplying a plurality of liquids, and a mixing area at the inlet end within which the liquids may mix.

16. A filter as claimed in claim 1 including input means at the inlet end for supplying a liquid and a gas, and mixing means for mixing the liquid and gas.

17. A filter as claimed in claim 1 comprising at least two of the distensible members arranged in series along a longitudinal axis of the filter.

18. A filter comprising a filter housing having an inlet end and an outlet end, a distensible member extending longitudinally of the housing, and a plurality of fibers extending longitudinally of the housing and being secured at the inlet end, whereby when the distensible member is distended the fibers are compressed against the housing to create a graduated filter matrix between the inlet end and a pinch area between the distensible member and an inner surface of the housing, in which recesses or ridges are provided on the surface of the distensible member, and in which the distensible member has a central section which is relatively flexible and distal ends which are relatively stiff.

19. A filter comprising a filter housing having an inlet end and an outlet end, a distensible member extending longitudinally of the housing, and a plurality of fibers extending longitudinally of the housing and being secured at the inlet end, whereby when the distensible member is distended the fibers are compressed against the housing to create a graduated filter matrix between the inlet end and a pinch area between the distensible member and an inner surface of the housing, in which recesses or ridges are provided on the surface of the distensible member, and in which the fibers are electrically charged.

20. A filter comprising a filter housing having an inlet end and an outlet end, a distensible member extending longitudinally of the housing, and a plurality of fibers extending longitudinally of the housing and being secured at the inlet end, whereby when the distensible member is distended the fibers are compressed against the housing to create a graduated filter matrix between the inlet end and a pinch area between the distensible member and an inner surface of the housing, in which recesses or ridges are provided on the surface of the distensible member, and in which the fibers are magnetized.

21. A filter comprising a filter housing having an inlet end and an outlet end, a distensible member extending longitudinally of the housing, and a plurality of fibers extending longitudinally of the housing and being secured at the inlet end, whereby when the distensible member is distended the fibers are compressed against the housing to create a graduated filter matrix between the inlet end and a pinch area between the distensible member and an inner surface of the housing, in which recesses or ridges are provided on the surface of the distensible member, and in which areas of the housing are magnetized.

22. A method of operating a filter having a filter housing with a first end and a second end, a distensible member extending longitudinally of the housing, and a plurality of fibers extending longitudinally of the housing and being secured at the first end; the method comprising distending the distensible member to compress the fibers against the housing to create a graduated filter matrix between the first end and a pinch area between the distensible member and an inner surface of the housing; and passing a fluid to be filtered from the first end to the second end, in which the fluid is magnetized.

23. A method of operating a filter having a filter housing with a first end and a second end, a distensible member extending longitudinally of the housing, and a plurality of fibers extending longitudinally of the housing and being secured at the first end; the method comprising distending the distensible member to compress the fibers against the housing to create a graduated filter matrix between the first end and a pinch area between the distensible member and an inner surface of the housing; and passing a fluid to be filtered from the first end to the second end; wherein passing the fluid includes passing the fluid to remove solid material from the fluid by passing the fluid from the first end to the second end;
   including the step of flushing the filter by releasing the distensible member and passing a flushing fluid from the first to the second end; and wherein;
   the flushing fluid includes steam or a cleaning chemical.

24. A method of operating a filter having a filter housing with a first end and a second end, a distensible member extending longitudinally of the housing, and a plurality of fibers extending longitudinally of the housing and being secured at the first end; the method comprising distending the distensible member to compress the fibers against the housing to create a graduated filter matrix between the first end and a pinch area between the distensible member and an inner surface of the housing; and passing a fluid to be filtered from the first end to the second end; wherein passing the fluid includes passing the fluid to remove solid material from the fluid by passing the fluid from the first end to the second end;
   including the step of flushing the filter by releasing the distensible member and passing a flushing fluid from the first to the second end; and wherein:
   ultrasound is applied to the fibers during flushing.

25. A method of operating a filter having a filter housing with a first end and a second end, a distensible member extending longitudinally of the housing, and a plurality of fibers extending longitudinally of the housing and being secured at the first end; the method comprising distending the distensible member to compress the fibers against the housing to create a graduated filter matrix between the first end and a pinch area between the distensible member and an inner surface of the housing; and passing a fluid to be filtered from the first end to the second end; wherein passing the fluid includes passing the fluid to remove solid material from the fluid by passing the fluid from the first end to the second end; and including the step of drying material that has not passed through the filter.

26. A method of operating a filter having a filter housing with a first end and a second end, a distensible member extending longitudinally of the housing, and a plurality of fibers extending longitudinally of the housing and being secured at the first end; the method comprising distending the distensible member to compress the fibers against the housing to create a graduated filter matrix between the first end and a pinch area between the distensible member and an inner surface of the housing; and passing a fluid to be filtered from the first end to the second end; wherein passing the fluid includes passing the fluid to remove solid material from the fluid by passing the fluid from the first end to the second end; wherein:

a gas is mixed with the liquid.

27. A method as claimed in claim 26 in which the gas is cut up into micro-bubbles before being mixed with the liquid.

28. A method of operating a filter having a filter housing with a first end and a second end, a distensible member extending longitudinally of the housing, and a plurality of fibers extending longitudinally of the housing and being secured at the first end; the method comprising distending the distensible member to compress the fibers against the housing to create a graduated filter matrix between the first end and a pinch area between the distensible member and an inner surface of the housing; and passing a fluid to be filtered from the first end to the second end; wherein passing the fluid includes passing the fluid to remove solid material from the fluid by passing the fluid from the first end to the second end; and wherein:

at least two distensible members are arranged in series along the longitudinal axis of the filter.

\* \* \* \* \*